United States Patent
Liu et al.

(10) Patent No.: US 7,706,812 B2
(45) Date of Patent: Apr. 27, 2010

(54) SYSTEM AND METHOD FOR DETECTING LOCATIONS OF A CUSTOMER PREMISES EQUIPMENT

(75) Inventors: Qingwen Liu, Richardson, TX (US); Hang Jin, Plano, TX (US); Weiguo Xie, Plano, TX (US); John Grabner, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 65 days.

(21) Appl. No.: 11/734,670

(22) Filed: Apr. 12, 2007

(65) Prior Publication Data

US 2008/0020785 A1   Jan. 24, 2008

Related U.S. Application Data

(60) Provisional application No. 60/801,936, filed on May 19, 2006.

(51) Int. Cl.
  *H04M 3/42* (2006.01)
  *H04W 4/00* (2009.01)
  *H04W 24/00* (2009.01)
(52) U.S. Cl. .............. 455/456.2; 455/414.1; 455/422.1; 455/456.1; 455/456.3; 455/456.4; 455/456.5; 455/456.6
(58) Field of Classification Search .............. 455/414.1, 455/422.1, 456.1–456.6
See application file for complete search history.

(56) References Cited

U.S. PATENT DOCUMENTS

| | | | | |
|---|---|---|---|---|
| 6,148,195 | A * | 11/2000 | Schuchman et al. | 455/424 |
| 6,255,992 | B1 * | 7/2001 | Madden | 342/424 |
| 6,810,028 | B1 * | 10/2004 | Giallorenzi et al. | 370/324 |
| 2003/0140771 | A1 * | 7/2003 | Ohshima | 84/622 |
| 2005/0042988 | A1 * | 2/2005 | Hoek et al. | 455/69 |
| 2005/0105485 | A1 | 5/2005 | Cleveland | |
| 2006/0061469 | A1 * | 3/2006 | Jaeger et al. | 340/539.13 |
| 2006/0234704 | A1 * | 10/2006 | Lee et al. | 455/434 |

OTHER PUBLICATIONS

International Search Report and Written Opinion dated Oct. 1, 2008 cited in PCT/US07/66603.

* cited by examiner

*Primary Examiner*—Patrick N Edouard
*Assistant Examiner*—Matthew W Genack

(57) ABSTRACT

A system and method are provided for detecting locations of a customer premises equipment in a wireless communication system with one or more base transceiver stations and one is efficient. A plurality of antennas in a base transceiver station (BTS) receives signals transmitted from a customer premises equipment (CPE). A timing detection module extracts the timing offset from the receiving signals and a first calculation module calculates the distance between the BTS and the CPE based on the timing offset. A signal detection module detects magnitudes and phases of the receiving signals and a second calculation module determines a dominant beam according to the antenna pattern and calculates the direction of arrival of the dominant beam. A third calculation module calculates the location of the CPE relative to the BTS based on the distance and the direction of arrival.

20 Claims, 5 Drawing Sheets

SYSTEM AND METHOD FOR DETECTING LOCATIONS OF A CUSTOMER PREMISES EQUIPMENT

CROSS REFERENCE

The present application claims the benefit of U.S. Provisional Application Ser. No. 60/801,936, which was filed on May 19, 2006, and titled "Location via Antenna Array".

BACKGROUND

One of the value-added services supplied by wireless network service providers is to provide personalized services based on the location of a subscriber. The coordinates for a mobile customer premises equipment (CPE), obtained by using the Global Positioning System (GPS), are often shown in a latitude and longitude. This location information is valuable to network service providers. By gathering the location information about a CPE, network service providers can manage network resources more efficiently, support traffic monitoring more effectively, and develop a more economic frequency reuse plan. Furthermore, network service providers can deploy location-based applications, such as navigation services, E911 services, and real-time advertisement, based on the geographic location of a CPE.

A session in the subscription-based wireless network defines a communication task between a base transceiver station (BTS) and a CPE. A session profile contains all but location information related to the session between the BTS and the CPE. The session profile includes information such as the power level of the physical layer, the frequency allocation of the medium access control layer, the provisioning parameters of quality of service, and accounting information. The CPE may support multiple sessions simultaneously.

Other statistics, such as the duration of the session, the bandwidth consumed by the session, the speed of the movement of the CPE, also provide important information about the CPE. The GPS coordinates for a location, the session profile, and the statistics information about the CPE facilitate the creation of new services, which, in turn, generate more revenue for network service providers.

A conventional wireless communication system that provides location-based services requires multiple BTSs to gather information about a CPE and it also requires a back-end server to collect information about the CPE from all participating BTSs and determine the GPS location of the CPE. There are many ways to determine the location of a CPE, based on the information collected by multiple BTSs.

In a wireless communication system with BTSs that have multiple antennas, it could take only one BTS to monitor and track the movement of a CPE. This BTS gathers the information from all receiving antennas and then retrieves helpful information. It is thus to provide the capability to process the information to determine the GPS coordinates for a CPE and create innovative services.

An advantage of the invention is that it improves the prior art solutions by offering a better way to determine the GPS location of a CPE while the system only requires one BTS.

SUMMARY

A system and a method are providing for detecting locations of a customer premises equipment in a wireless communication system with one or more base transceiver stations and one is sufficient. A plurality of antennas in a base transceiver station receives signals transmitted from a customer premises equipment. A timing detection module extracts the timing offset from the receiving signals and a first calculation module calculates the distance between the BTS and the CPE based on the timing offset. A signal detection module detects magnitudes and phases of the receiving signals and a second calculation module determines a dominant beam according to the antenna pattern and calculates the direction of arrival of the dominant beam. A third calculation module calculates the location of the CPE relative to the BTS based on the distance and the direction of arrival.

DESCRIPTION

A system is provided for detecting locations of a CPE in a wireless communication system with one or more BTSs and one is sufficient. A method is also provided to more accurately determine the GPS coordinates for a CPE using one BTS equipped with an array of antennas.

One of the embodiments disclosed herein is a location-based service system. The location-based service system utilizes the GPS location information about a CPE to provide better services and operate more efficiently.

The method disclosed herein determines the GPS coordinates for a CPE by deriving the DOA from the antenna beam pattern of a BTS and mapping the absolute Cartesian coordinates to the GPS coordinates for the CPE. The absolute Cartesian coordinates are determined by the following parameters: the distance between the BTS and the CPE, the DOA of the antenna beam, and the Cartesian coordinates for the BTS.

The location-based service system described herein only requires a single BTS to determine the GPS location of a CPE, facilitates the extracting of the data from the location information based on the GPS, and generates innovative applications to better serve the subscribers of the wireless network. The accuracy of the estimated GPS location will be improved with more BTSs participating in the process, but unlike a conventional system, the system disclosed herein does not require an additional BTS.

Figure 1:
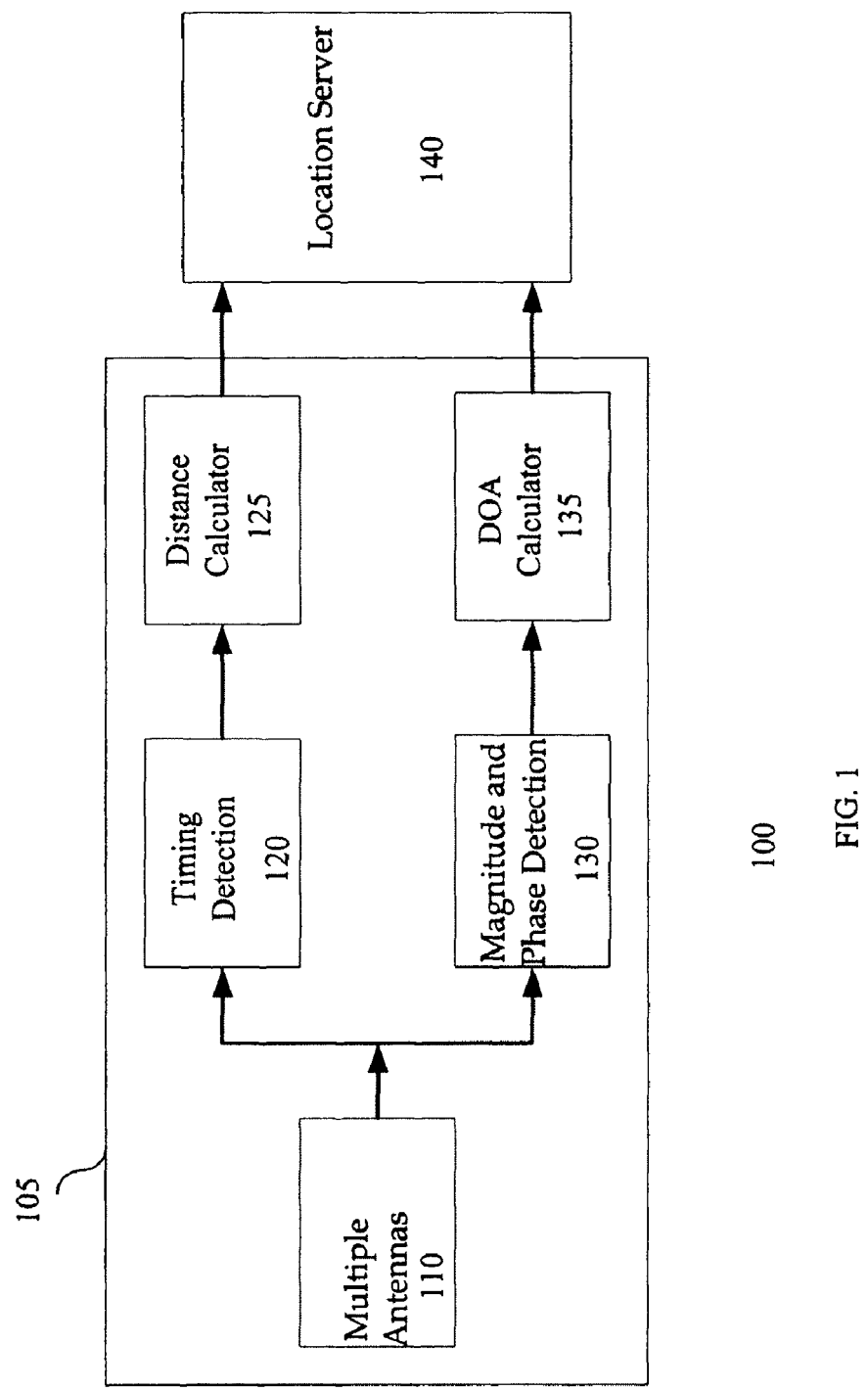
FIG. 1 is a block diagram illustrating a system for detecting locations of a CPE.

FIG. 1 is a block diagram illustrating a system 100 for detecting locations of a CPE. Block 110 is a plurality of antennas on a BTS 105. The plurality of antennas on the BTS receives signals transmitted from the CPE.

Block 120 is a timing detection module that extracts a timing offset from receiving signals. Block 125 is a distance calculator that calculates the distance between the BTS and the CPE based on timing offset information. Block 130 is a signal detection module that detects magnitudes and phases of the antenna pattern of the receiving signals. Block 135 is a DOA calculator that determines a dominant beam of the antenna pattern and calculates the direction of arrival (DOA) of the signal from the dominant beam. Block 140 is a location server that calculates the location of the CPE relative to the BTS based on the data produced by blocks 125 and 135.

Figure 2:
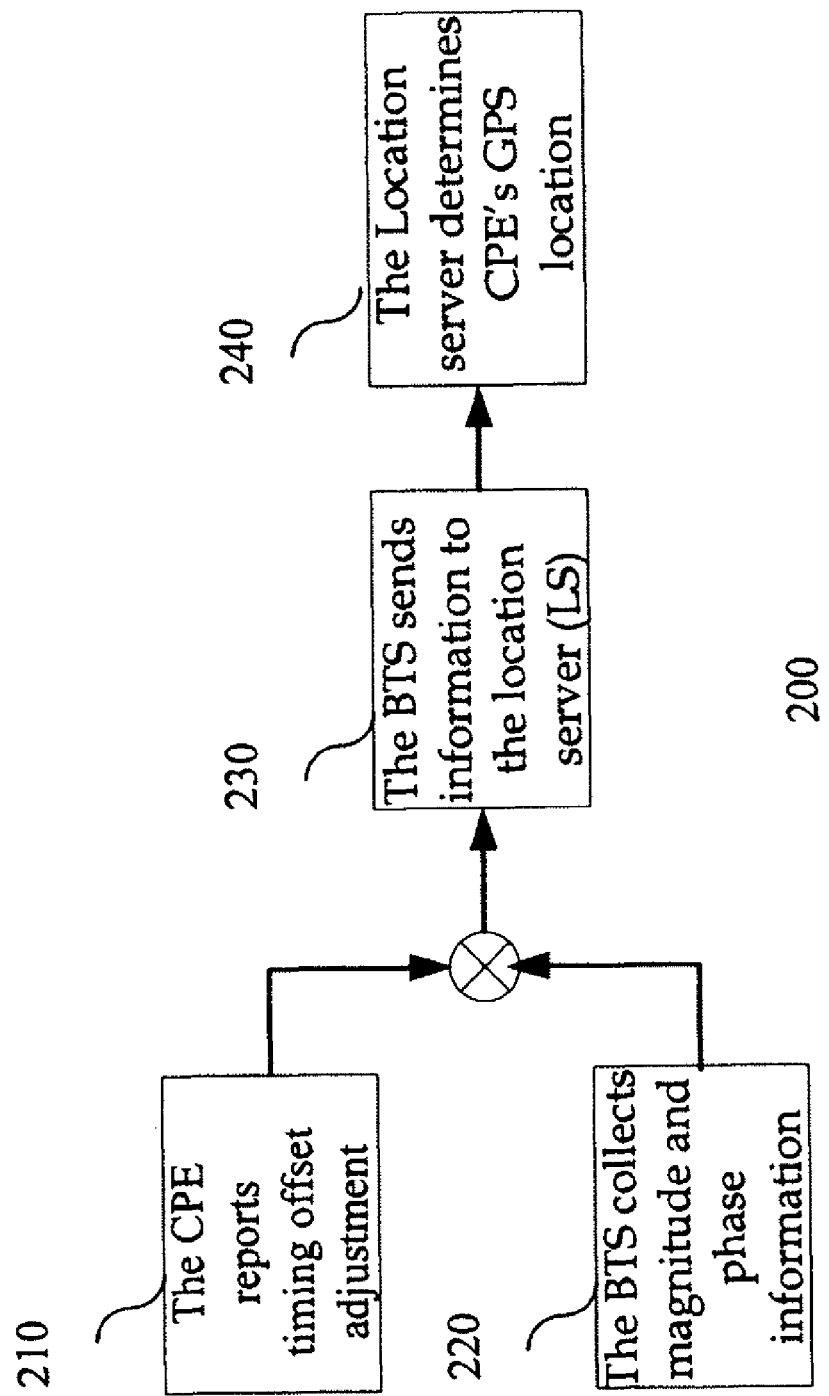
FIG. 2 illustrates a system for determining the GPS coordinates for a CPE.
Figure 3:
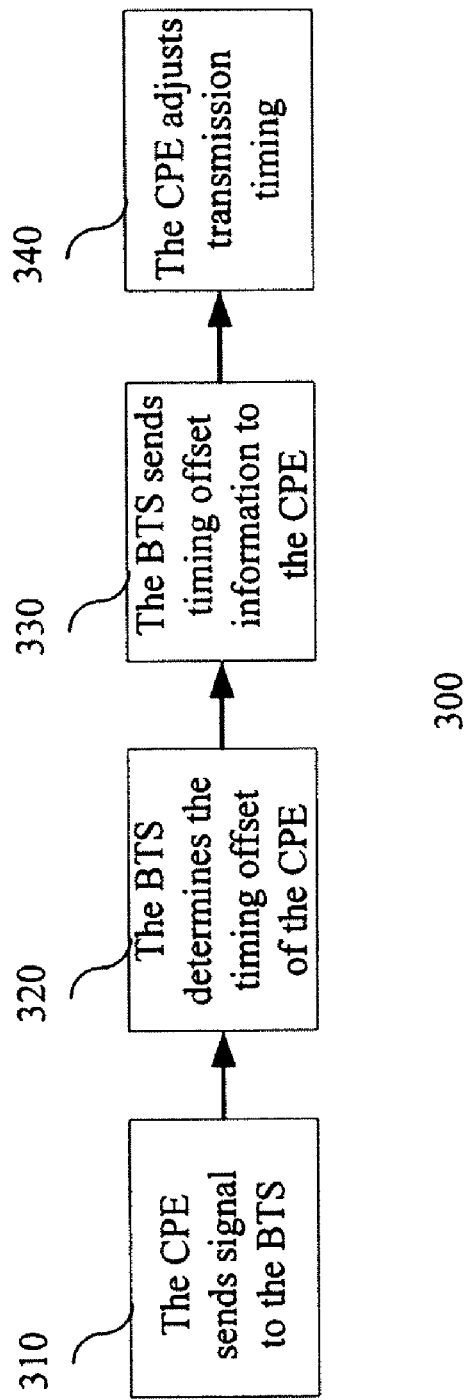
FIG. 3 illustrates a close-loop transmission timing adjustment.

FIG. 2 is a flow diagram illustrating the determination of the GPS coordinates for a CPE by a location server. There are four steps in the flow diagram. In step 210, the CPE calculates a timing offset adjustment, which represents the sum of an open-loop timing adjustment and a close-loop timing adjustment, and subsequently reports it to the BTS. FIG. 3 further describes a method to calculate the timing offset of the CPE.

Figure 4:
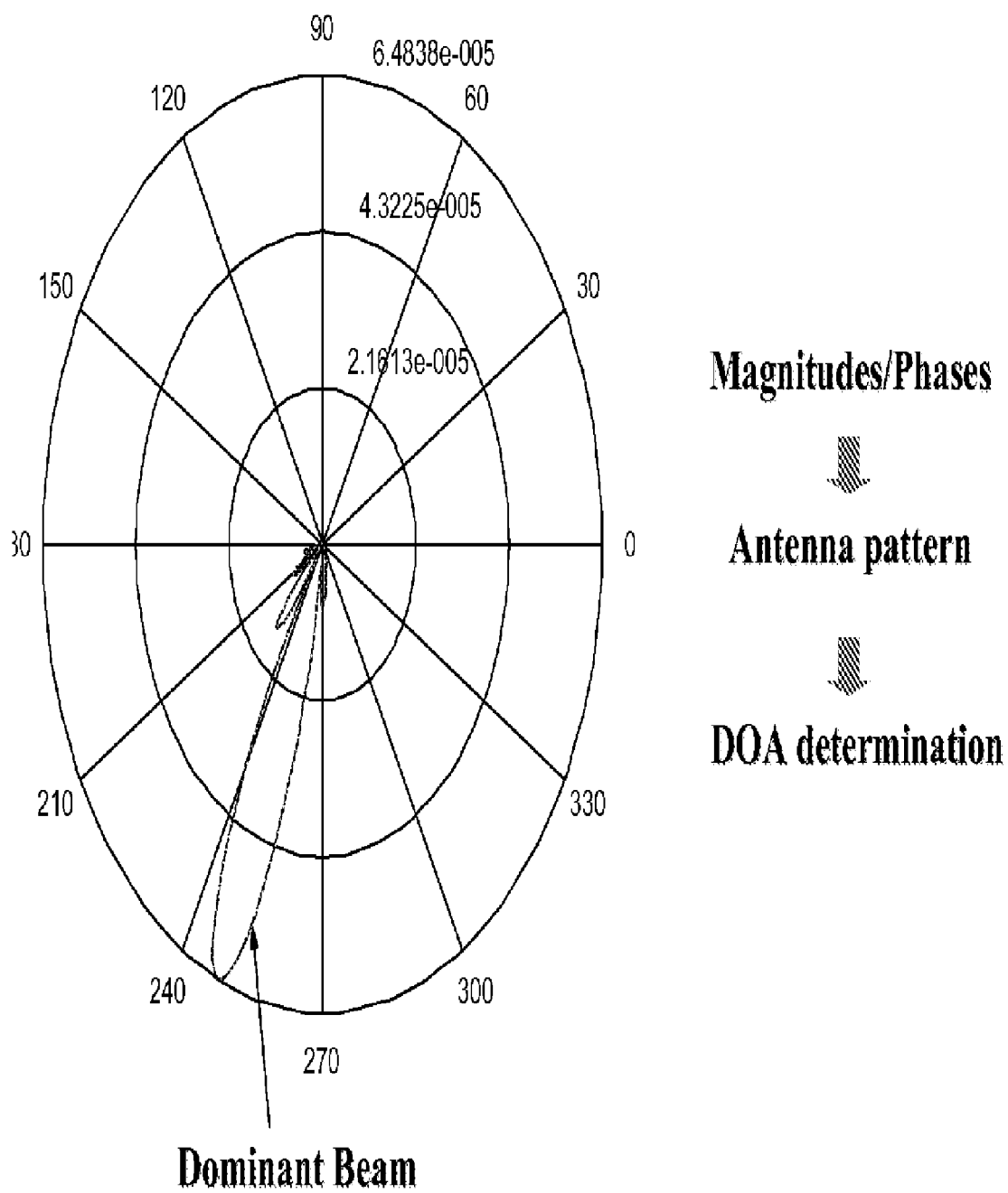
FIG. 4 is a diagram of the antenna pattern of a BTS with respect to a CPE.

In step 220, the BTS collects magnitude and phase information about the receiving signal, transmitted from an array of antennas by the CPE. The BTS determines the DOA of the receiving signal based on the magnitude and phase information about the antenna beam pattern. The beam with the largest amplitude in the antenna beam pattern is designated as the dominant beam, the direction of which determines the DOA. FIG. 4 is a diagram of an antenna beam pattern.

Figure 5:
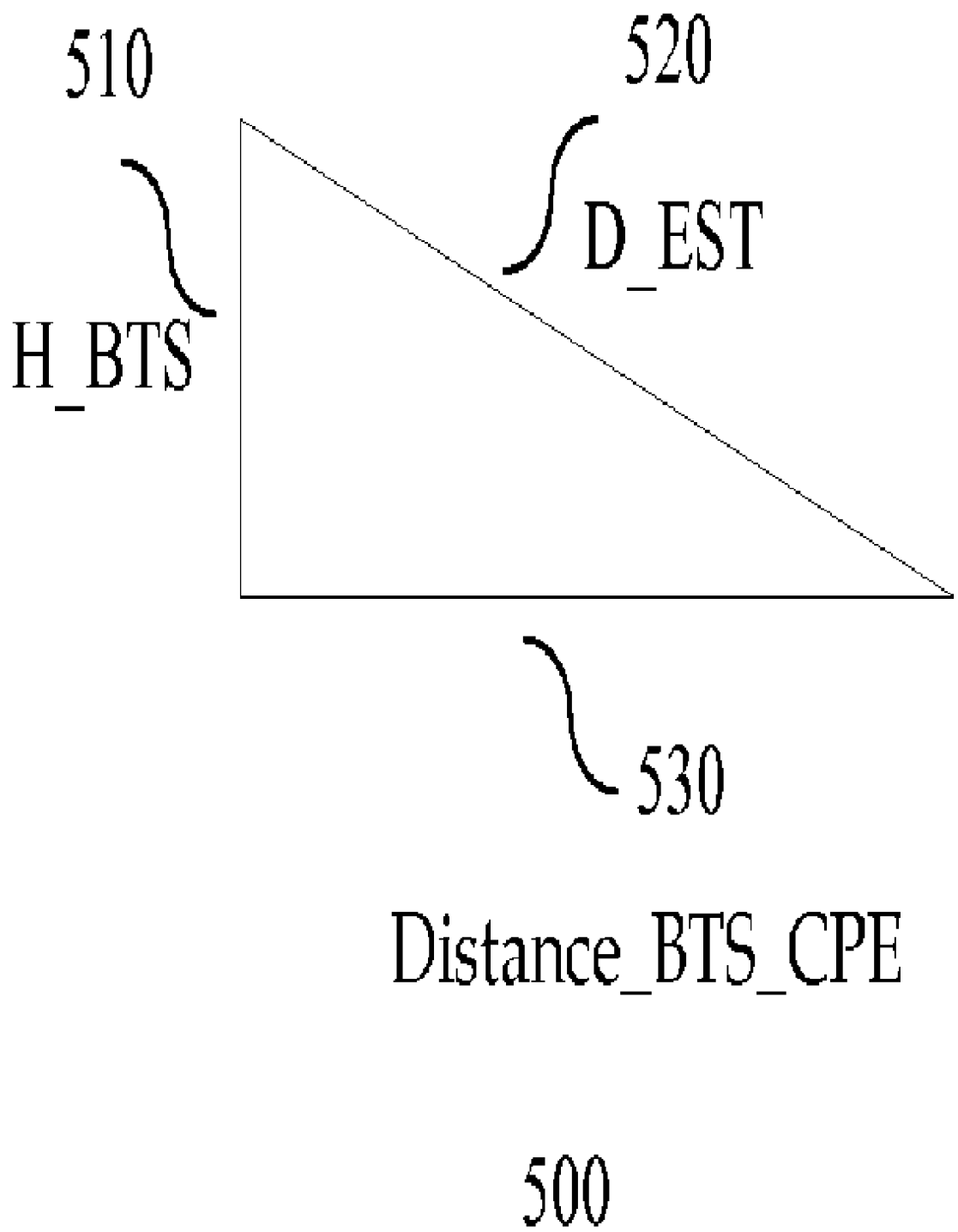
FIG. 5 shows a method for obtaining the distance of a CPE to a BTS.

In step 230, the BTS sends to a location server (LS) the timing offset, DOA, and session profile information about the CPE. The LS calculates the two dimensional Cartesian coordinates for the CPE based on the timing offset and DOA information. FIG. 5 further describes the procedure to calculate the two dimensional Cartesian coordinates for the CPE.

In step 240, the location server maps the two dimensional Cartesian coordinates to the GPS coordinates; namely, latitude and longitude, for the CPE. The mapping involves geographic mathematics. Because the shape of the earth is slightly oblate, many approximation methods can be used to map the two dimensional Cartesian coordinates to the GPS coordinates for a location. One embodiment of the approximation is to let the longitude of the CPE equal to X_CPE_absolute and the latitude of the CPE equal to Y_CPE_absolute.

The accuracy of the GPS coordinates for the CPE depends on the accuracy of the estimation of the distance between the BTS and the CPE and DOA. Several postprocessing procedures can be adopted to remove the erroneous information that is less accurate. There are three filter modules that facilitate postprocessing, and they are the signal-to-noise-ratio (SNR) filtering module, the beamforming filtering module, and the speed filtering module.

The SNR filtering module eliminates the calculated DOA and distance information if the corresponding SNR is less than a given threshold. The beamforming filtering module eliminates the calculated DOA and distance information if the ratio of the amplitude of the dominant beam to the average amplitude of the rest of the beams is less than a given threshold. As to the speed filtering module, it eliminates the calculated DOA and distance information if the speed of the CPE derived from the consecutive records is lager than a given threshold. The three filtering modules can be used individually or consecutively in a predetermined order.

FIG. 3 is a flow diagram of a close-loop adjustment. In step 310, after receiving the signals sent by a BTS, a CPE transmits a signal to the BTS at a scheduled time. In Step 320, the BTS determines the timing offset of the CPE. In Step 330, the BTS sends a timing offset adjustment message to the CPE. In Step 340, the CPE makes a timing correction by adjusting its transmission timing according to the received adjustment message when sending signals to the BTS afterwards.

In an open-loop adjustment, the CPE adjusts the timing offset according to some internal references. For example, if the downlink timing of the receiving signal is advanced by $\Delta t$, the CPE will delay the uplink timing by the same amount $\Delta t$. The CPE sums up the open-loop and close-loop timing offset adjustments and reports the result to the BTS.

A conventional method to obtain DOA information is to apply the eigenvalue decomposition method to an antenna input correlation matrix. There are several eigenvalue decomposition methods, such as the Min-Norm method, the Multiple Signal Classification (MUSIC), and the Estimation of Signal Parameters via Rotational Invariance Techniques (ESPRIT). The method disclosed herein obtains DOA information using the signals received by multiple antennas on a BTS.

FIG. 4 is a diagram illustrating an antenna beam pattern of a BTS with respect to a CPE. The diagram shows the magnitude and direction of the detected beams. The beam with the largest amplitude is designated as the dominant beam whose direction is DOA. In FIG. 4, the DOA is 250 degrees.

FIG. 5 is a diagram to explain how a location server calculates the two dimensional Cartesian coordinates for a CPE.

Let D_EST 520 denote the line-of-sight distance between a BTS and a CPE and be represented by the following equation: D_EST=c*timing_offset, where c is the speed of light, which is roughly equal to $3*10^8$ (meters/second), and timing_offset is the timing offset of the CPE. Let H_BTS 510 denote the height of a BTS tower. The distance between the BTS and the CPE is calculated based on the following equation: Distance_BTS_CPE 530=sqrt(D_EST$^2$-H_BTS$^2$).

The relative Cartesian coordinates for the CPE are determined by two values, and they are the distance between the BTS and the CPE and DOA. The relative Cartesian coordinates for the CPE are calculated according to the following equations: X_CPE_relative=Distance_BTS_CPE*cos (DOA) and Y_CPE_relative=Distance_BTS_CPE*sin (DOA).

The absolute Cartesian coordinates for the CPE are calculated according to the following equations: X_CPE_absolute=X_BTS_absolute+X_CPE_relative and Y_CPE_absolute=Y_BTS_absolute+Y_CPE_relative.

In a wireless network with multiple BTSs, the accuracy of the estimation of a CPE location can be further improved by reporting the CPE location collaboratively by multiple BTSs. The BTSs in such a system could establish communication channels among themselves to exchange the location information about the CPE. The CPE communicates with one or more BTSs simultaneously. The geographic mathematics can also be applied to the estimation process to improve the accuracy of the estimation of the CPE location.

The system disclosed herein comprises multiple CPEs and one or more BTSs, and one or more servers. The BTS gathers the distance and DOA information about the CPE and the associated session profile and sends them to a server, for example a location server, to determine the CPE location. The server, in turn, calculates the GPS coordinates for the CPE and modifies the associated session profile and sends them to a server with development tools, for example an application server.

The development tools in the server use the updated session profile and the GPS location information about the CPE to extract data that facilitates the creation of new services.

One example of the data extracted from the session profile and the GPS location information is the moving-path of the CPE. An application can generate a plot to display the estimated and actual moving-paths of the CPE. The moving-path plot can help wireless network service providers to improve network resource planning.

Wireless network service providers can develop numerous applications to exploit the data embedded in the GPS location information. For example, the space division multiple access (SDMA), the drop call analysis, the SNR/traffic density geographic analysis, the geographic-information based power/bandwidth allocation, and the handoff assistance.

New businesses can also be developed based on the information about the movement of CPEs to benefit the subscribers of the wireless network. These new businesses include, but are not limited to, the CPE location-based Google® map, the local business search, the advertisement, the E911, the navigation, and the real-time highway traffic report.

What is claimed is:

1. A system comprising:
    at least one customer premises equipment (CPE) whose location may vary, wherein the CPE is configured to:
        generate an open-loop timing adjustment to a timing offset;
        generate a closed-loop timing adjustment to the timing offset;
        sum the open-loop timing adjustment and the closed-loop timing adjustment;
        report the sum of the open-loop timing adjustment and closed-loop timing adjustment in an uplink signal;
    at least one base transceiver station (BTS) that is configured to communicate with the CPE, wherein the BTS comprises a plurality of antennas configured to receive a plurality of beams associated with the uplink signal transmitted from the CPE and received at the BTS, wherein the BTS comprises one or more processing modules configured to:
        extract the timing offset from the uplink signal based on the sum of the open-loop timing adjustment and the closed-loop timing adjustment;
        calculate a distance between the BTS and the CPE based on the timing offset;
        detect magnitudes and phases of the plurality of beams;
        determine a dominant beam among the plurality of beams and calculate a direction of arrival (DOA) of the dominant beam;
        eliminate the calculated DOA and the calculated distance if a ratio of the amplitude of the dominant beam to an average amplitude of remaining beams is less than a threshold; and
        calculate a location of the CPE relative to the BTS based on the distance and the DOA when a ratio of the amplitude of the dominant beam to an average amplitude of remaining beams is not less than the threshold.

2. The system of claim 1, wherein the CPE is configured to generate the closed-loop timing adjustment in response to a signal received from the BTS, by transmitting a signal to the BTS at a scheduled time, wherein the BTS is configured to determine a timing offset based on the signal received from the CPE and to generate a timing offset adjustment message containing the timing offset that serves as the closed-loop timing adjustment for the CPE and which timing offset adjustment message is transmitted by the BTS to the CPE, and wherein the CPE is configured to adjust its transmission timing for signals subsequently transmitted to the BTS based on the timing offset contained in the timing offset adjustment message.

3. The system of claim 2, wherein the CPE is further configured to generate the open-loop timing adjustment by determining a timing offset associated with the signal received from the BTS with respect to an internal timing reference.

4. The system of claim 1, wherein the one or more processing modules of the BTS is configured to select a beam with the largest amplitude at the plurality of antennas of the BTS as the dominant beam.

5. The system of claim 1, wherein the one or more processing modules of the BTS is configured to convert the location of the CPE relative to the BTS to a set of global positioning system (GPS) coordinates based on a location of the BTS.

6. The system of claim 5, wherein the one or more processing modules of the BTS is configured to calculate absolute Cartesian coordinates for the CPE and to map the absolute Cartesian coordinates to the GPS coordinates.

7. A system comprising:
    one or more customer premises equipment (CPE) whose locations may vary, wherein the CPE comprises an antenna array and is configured to transmit signals via the antenna array, and wherein the CPE is configured to:
        generate an open-loop timing adjustment to a timing offset;
        generate a closed-loop timing adjustment to the timing offset;
        sum the open-loop timing adjustment and the closed-loop timing adjustment;
        report the sum of the open-loop timing adjustment and the closed-loop timing adjustment in an uplink signal;
    at least one base transceiver station (BTS) that is configured to communicate with the one or more CPEs, wherein the BTS comprises a plurality of antennas configured to receive a plurality of beams associated with the uplink signal transmitted via the antenna array of the CPE and received at the BTS, wherein the BTS comprises one or more processing modules configured to:
        extract the timing offset from the uplink signal based on the sum of the open-loop timing adjustment and the closed-loop timing adjustment;
        calculate a distance between the BTS and the CPE based on the timing offset;
        detect magnitudes and phases of the plurality of beams;
        determine a dominant beam among the plurality of beams and calculate a direction of arrival (DOA) of the dominant beam;
        eliminate the calculated DOA and the calculated distance if a ratio of the amplitude of the dominant beam to an average amplitude of remaining beams is less than a threshold;
        calculate a location of the CPE relative to the BTS based on the distance and the DOA when a ratio of the amplitude of the dominant beam to an average amplitude of remaining beams is not less than the threshold; and
        convert the location of the CPE relative to the BTS to a set of global positioning system (GPS) coordinates based on a GPS location of the BTS.

8. The system of claim 7, wherein the CPE is configured to generate the closed-loop timing adjustment in response to a signal received from the BTS, by transmitting a signal to the BTS at a scheduled time, wherein the BTS is configured to determine a timing offset based on the signal received from the CPE and to generate a timing offset adjustment message containing the timing offset that serves as the closed-loop timing adjustment for the CPE and which timing offset adjustment message is transmitted by the BTS to the CPE, and wherein the CPE is configured to adjust its transmission timing for signals subsequently transmitted to the BTS based on the timing offset contained in the timing offset adjustment message.

9. The system of claim 8, wherein the CPE is further configured to generate the open-loop timing adjustment by determining a timing offset associated with the signal received from the BTS with respect to an internal timing reference.

10. The system of claim 7, wherein the one or more processing modules of the BTS is configured to select a beam with the largest amplitude at the plurality of antennas of the BTS as the dominant beam.

11. The system of claim 7, wherein the one or more processing modules of the BTS is configured to calculate absolute Cartesian coordinates for the CPE and to map the absolute Cartesian coordinates to the GPS coordinates.

12. A method comprising:
   at a base transceiver station comprising a plurality of antennas, receiving a transmission from a customer premises equipment (CPE) whose location may vary, wherein the transmission received at the plurality of antennas produces a received beam pattern comprising a plurality of beams and comprises timing offset adjustment data computed by the CPE as a sum of a generated open-loop timing adjustment and a generated closed-loop timing adjustment;
   determining a direction of arrival of a dominant beam among the plurality of beams;
   extracting the timing offset data from the transmission based on the sum of the open-loop timing adjustment and the closed-loop timing adjustment;
   calculating a distance between the BTS and the CPE based on the timing offset data;
   eliminating the calculated DOA and the calculated distance if a ratio of the amplitude of the dominant beam to an average amplitude of remaining beams is less than a threshold; and
   calculating a location of the CPE relative to the BTS based on the direction of arrival and the distance when the amplitude of the dominant beam to an average amplitude of remaining beams is not less than the threshold.

13. The method of claim 12, wherein the dominant beam is a beam of the plurality of beams with a largest amplitude.

14. The method of claim 12, and further comprising generating the closed-loop timing adjustment at the CPE by the CPE transmitting a signal to the BTS at a scheduled time in response to a signal received from the BTS, determining at the BTS a timing offset based on the signal received from the CPE, generating at the BTS a timing offset adjustment message containing the timing offset that serves as the closed-loop timing adjustment for the CPE, transmitting the timing offset adjustment message from the BTS to the CPE, and adjusting transmission timing at the CPE for signals that the CPE subsequently transmitted to the BTS based on the timing offset contained in the timing offset adjustment message.

15. The method of claim 14, and further comprising generating at the CPE the open-loop timing adjustment by determining a timing offset associated with the signal received from the BTS with respect to an internal timing reference.

16. The method of claim 12, and further comprising:
   calculating absolute Cartesian coordinates for the location of the CPE relative to the BTS; and
   mapping the absolute Cartesian coordinates to a set of global positioning system (GPS) coordinates based on a location of the BTS.

17. The method of claim 16, wherein calculating the absolute Cartesian coordinates is based on the distance and the direction of arrival.

18. The system of claim 1, wherein the BTS further comprises:
   a signal to noise ratio (SNR) filtering module configured to eliminate the calculated DOA and the calculated distance if a corresponding SNR is less than a SNR threshold; and
   a speed filtering module configured to eliminate the calculated DOA and the calculated distance if a speed of the CPE derived from consecutive location measurements is larger than a speed threshold.

19. The system of claim 1, wherein the module of the BTS that calculates the DOA is configured to calculate the DOA using eigenvalue decomposition of an antenna input correlation matrix.

20. The method of claim 12, further comprising:
   eliminating the calculated DOA and the calculated distance if a corresponding signal-to-noise ratio is less than a signal-to-noise ratio threshold; and
   eliminating the calculated DOA and the calculated distance if a speed of the CPE derived from consecutive location measurements is larger than a speed threshold.

* * * * *